United States Patent [19]

Itoh

[11] Patent Number: 4,591,670
[45] Date of Patent: May 27, 1986

[54] ECHO CANCELLER AND ECHO SUPPRESSOR FOR FREQUENCY DIVISIONAL ATTENUATION OF ACOUSTIC ECHOES

[75] Inventor: Yasuo Itoh, Tokyo, Japan
[73] Assignee: NEC Corporation, Tokyo, Japan
[21] Appl. No.: 532,628
[22] Filed: Sep. 15, 1983
[30] Foreign Application Priority Data Sep. 30, 1982 [JP] Japan ............................. 57-171681

[51] Int. Cl.⁴ ............................................. H04B 3/20
[52] U.S. Cl. ................................ 179/170.2; 179/170.6
[58] Field of Search ............... 179/170.2, 81 A, 81 B, 179/81 BC; 381/71, 93, 94, 95

[56] References Cited

U.S. PATENT DOCUMENTS

| | | | |
|---|---|---|---|
| 3,754,105 | 8/1973 | Poschenreider et al. | 179/170.2 |
| 3,784,747 | 1/1974 | Berkley et al. | 179/81 B |
| 4,225,754 | 9/1980 | Bernard et al. | 179/81 B |
| 4,362,909 | 12/1982 | Snijders et al. | 179/170.2 |

*Primary Examiner*—Gene Z. Rubinson
*Assistant Examiner*—R. Vaas
*Attorney, Agent, or Firm*—Sughrue, Mion, Zinn, Macpeak & Seas

[57] ABSTRACT

An echo cancelling circuit is composed of digital circuits. An echo canceller is supplied with lower send-in and receive-in components derived from a send-in and a receive-in digital signal, respectively, in a lower frequency band below a predetermined frequency. The echo canceller produces a lower digital signal component which is free from a lower echo signal component. The echo canceller furthermore produces a control signal indicative of presence and absence of a lower voice signal component in the lower send-in component. Controlled by the control signal and supplied with a higher send-in component of a frequency band higher than the predetermined frequency, an adjustable attenuator produces a higher digital signal component in which a higher echo signal component is suppressed with no attenuation and either a constant or an adjustable positive attenuation given to the higher send-in component when the control signal indicates presence and absence of the lower voice signal component, respectively. The lower and the higher digital signal components are combined into a send-out signal exempted from the echo signal, which may or may not comprise a reverberation signal introduced into the send-in digital signal by audible sound reproduced from a voice signal carried by the receive-in digital signal.

6 Claims, 4 Drawing Figures

ECHO CANCELLER AND ECHO SUPPRESSOR FOR FREQUENCY DIVISIONAL ATTENUATION OF ACOUSTIC ECHOES

BACKGROUND OF THE INVENTION

This invention relates to an echo canceller or cancelling circuit for use in a long-distance telephone network and, more specifically, in a long-distance conference communication system.

In a long-distance telephone network, an echo canceller is coupled to a combination of transmitter and receiver. The echo canceller receives a receive-in signal from a remote party through a receiving path, feeds a receive-out signal to the receiver, receives a send-in signal from the transmitter, and delivers a send-out signal to the remote party through a sending path.

The send-in signal comprises an audio signal when speech or conversation is input to the transmitter. The audio signal becomes the send-out signal. The receive-out signal corresponds to the receive-in signal. The receive-in signal also comprises an audio signal which is produced by the remote party and causes the receiver reproduce audible sound. The audio signal comprised by the send-in and the receive-in signals, will herein be called an acoustic and a voice signal, respectively, merely for convenience of description.

A part of the receive-in signal tends to leak into the send-out signal as an echo signal in the manner known in the art. The echo canceller is for cancelling the echo signal.

Long-distance conference communication systems have become known in the art. Such systems are effective for holding a conference or meeting of participants or attendants living in remote locations because the participants need not be present in a single conference or meeting. The system is for use in connecting a plurality of auditoriums by a wired, a radio, and/or a satellite communication network.

In a long-distance conference communication system, a loudspeaker is used as the receiver. At least one microphone is used as the transmitter. The loudspeaker is unavoidably acoustically coupled to the microphone. It is inevitable that a part of the audible sound reproduced by the loudspeaker is picked up by the microphone resulting in a reverberation signal in the send-in signal. The reverberation signal is transferred to the send-out signal and sent back to the remote party. In an unfavorable case, the reverberation signal gives rise to howling. At any rate, the reverberation signal appears from the receive-in signal as an echo signal of a sort in the send-out signal.

For use in a long-distance conference communication system, an echo canceller should therefore exempt the send-out signal from the echo signal which comprises the reverberation signal. It should be noted in this connection that the echo signal resulting from the reverberation signal may have a considerably long duration.

An echo cancelling circuit is disclosed in U.S. patent application Ser. No. 393,893 filed June 30, 1982, by Takashi Araseki et al, assignors to the present assignee. As will later be described with reference to one of a few figures of the accompanying drawings, the echo cancelling circuit is for exempting the send-out signal substantially from the echo signal which may or may not comprise a reverberation signal.

As discussed in the above-referenced patent application, it is possible to understand that the receive-in, the reverberation, and the send-in signals share a lower and a higher frequency band in common. The lower and the higher frequency bands are lower and higher than a predetermined frequency as, for example, 1.7 kHz.

According to the above-cited patent application, attention is directed to the fact that each of the receive-in, the reverberation, and the send-in signals has a considerably higher intensity or power spectrum in the lower frequency band than in the higher frequency band. In view of this fact, the echo cancelling circuit comprises a filter circuit responsive to the reverberation signal for separately producing a lower and a higher reverberation component in the lower and the higher frequency bands, another filter circuit responsive to the receive-in signal for separately producing a lower and a higher receive-in component in the lower and the higher frequency bands, a self-adaptive echo canceller responsive to the lower reverberation component and the lower receive-in component for self-adaptively cancelling the lower reverberation component to produce a lower send-out component, echo suppressing means responsive to the higher reverberation component and the higher receive-in component for suppressing the higher reverberation component to produce a higher send-out component, and send-out signal producing means responsive to the lower and the higher send-out components for producing the send-out signal.

The self-adaptive echo canceller is of a digital type. Other components of the prior-art echo cancelling circuit are analog circuits. As a consequence, the prior-art echo cancelling circuit is still bulky and is not completely reliable. Moreover, the echo suppressing means is made to respond to the higher reverberation and receive-in components. This means that detection must be carried out in the higher frequency band as regards double talk, namely, as regards the presence and absence of the above-described acoustic or voice signal. Inasmuch as the intensity is weak in the higher frequency band, this operation is liable to misdetection.

SUMMARY OF THE INVENTION

It is therefore an object of the present invention to provide an echo cancelling circuit which is compact and is yet stably operable.

It is another object of this invention to provide an echo cancelling circuit of the type described, which is mostly composed of digital circuits and may consequently be called a digital echo cancelling circuit.

According to this invention, an echo cancelling circuit is responsive to a receive-in digital signal for feeding a receive-out signal to a receiver and responsive to a send-in digital signal delivered from a transmitter for producing a send-out signal and furthermore for exempting from the send-out signal an echo signal resulting from the receive-in digital signal. The receive-in digital signal comprises a voice signal which makes the receiver reproduce audible sound. The send-in digital signal comprises an acoustic signal when speech is input to the transmitter.

The echo cancelling circuit comprises a first send-in digital filter responsive to the send-in digital signal for producing a lower send-in component of a lower frequency band, a second send-in digital filter responsive to the send-in digital signal for producing a higher send-in component of a higher frequency band, and a receive-in digital filter responsive to the receive-in digital signal for producing a lower receive-in component of the lower frequency band. When the send-in digital signal comprises an acoustic signal, the lower send-in component comprises an acoustic signal component. When the receive-in digital signal comprises a voice signal, the lower receive-in component comprises a voice signal component.

The echo cancelling circuit further comprises echo cancelling means responsive to the lower send-in component and the lower receive-in component for self-adaptively cancelling the echo signal to produce a lower local digital signal component which is exempted substantially from the echo signal. The echo cancelling means is furthermore responsive to at least one of the lower send-in component and the lower receive-in component for producing a control signal indicative of the presence and absence of the acoustic signal component.

The echo cancelling circuit still further comprises adjustable attenuating means responsive to the control signal for attenuating the higher send-in component only in the absence of the acoustic signal component to produce a higher local digital signal component irrespective of the presence and absence of the acoustic signal component, and combining means for combining the lower and the higher local digital signal components into the send-out signal.

DESCRIPTION OF THE PREFERRED EMBODIMENTS

Figure 1:
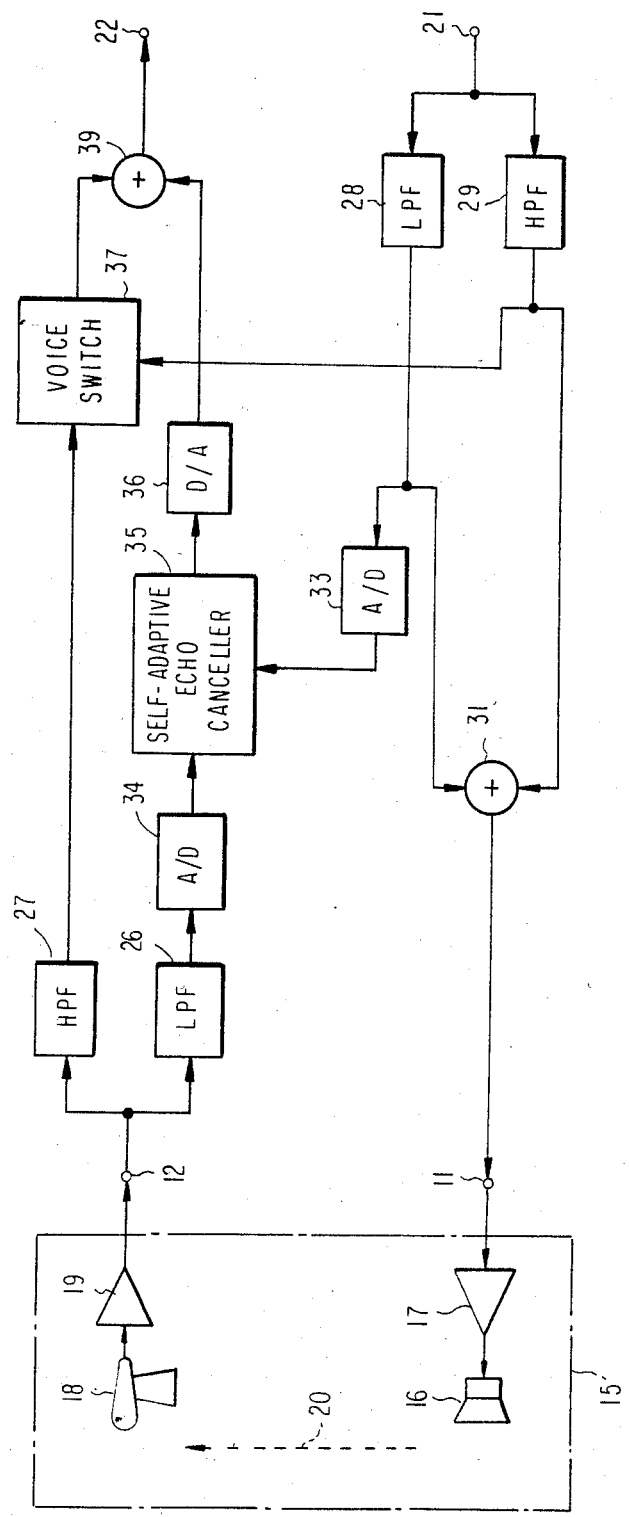
FIG. 1 is a block diagram of a conventional echo cancelling circuit.

Referring to FIG. 1, a conventional echo cancelling circuit will be described at first in order to facilitate an understanding of the present invention. The echo cancelling circuit is what is revealed in the above-referenced U.S. patent application.

Receive-out and send-in terminals 11 and 12 are for feeding a receive-out signal to adjacent acoustic equipment 15 and for receiving a send-in signal therefrom, respectively. In the example being illustrated, the adjacent acoustic equipment 15 is an acoustic installation in an auditorium and comprises a loudspeaker 16 to which the receive-out signal is supplied through an amplifier 17. As microphone 18 is for use by each of several attendants in the auditorium and is for connection to the send-in terminal 12 through another amplifier 19, which produces the send-in signal. It is inevitable that the microphone 18 responds not only to speech or conversation of a speaker but also to a part of the speech or voice reproduced as audible sound by the loudspeaker 16 as indicated by a dashed line 20.

A receive-in terminal 21 is for receiving a receive-in signal from a remote party through a receiving path (not shown). A send-out terminal 22 is for delivering a send-out signal to the remote party through a sending path (not shown). The receive-out signal is given by the receive-in signal. The send-out signal is derived primarily from the send-in signal and may comprise an echo signal which results from the receive-in signal in the manner known in the art.

When a speaker speaks into the microphone 18 the send-in signal comprises an acoustic or audio signal. Even in the absence of an acoustic signal from a local speaker, the send-in signal may comprise a reverberation signal which results from the audible sound reproduced by the loudspeaker 16 in response to the receive-out signal. The reverberation signal is therefore derived from the receive-in signal. The acoustic and the reverberation signals are transferred to the send-out signal. As a consequence, the reverberation signal is a significant part of the echo signal in a long-distance conference communication system.

The conventional echo cancelling circuit comprises a send-in low-pass filter 26 responsive to the send-in signal for producing a lower send-in signal component of a lower frequency band. When the send-in signal comprises the acoustic and the reverberation signals, the lower send-in signal component comprises a lower acoustic and a lower reverberation signal component, respectively. A send-in high-pass filter 27 is responsive to the send-in signal for producing a higher send-in component of a higher frequency band. When the send-in signal comprises the acoustic and the reverberation signals, the higher send-in signal component comprises a higher acoustic and a higher reverberation signal component. As pointed out heretobefore, the lower and the higher frequency bands may be lower and higher than a predetermined frequency of 1.7 kHz. It is known in the art that the power spectrum of an acoustic or voice signal concentrates at 1 kHz or lower.

A receive-in low-pass filter 28 is responsive to the receive-in signal for producing a lower receive-in signal component of the lower frequency band. A receive-in high-pass filter 29 responds to the receive-in signal to produce a higher receive-in signal component of the higher frequency band. The lower and the higher receive-in signal components are combined by an adder 31 into the receive-out signal.

A receive-in analog-to-digital converter 33 is for sampling the lower receive-in signal component at a predetermined sampling period to produce a lower receive-in digital component. A send-in analog-to-digital converter 34 is for sampling the lower send-in signal component at the predetermined sampling period to produce a lower send-in digital component. A self-adaptive echo canceller 35 is responsive to the lower receive-in digital component for producing a simulation signal which substantially simulates the echo signal. The echo canceller 35 is furthermore for subtracting the simulation signal from the lower send-in digital component to produce a local digital signal. As described before, the echo signal may consist essentially of the reverberation signal. When the lower send-in signal component comprises only the lower acoustic signal component, it is usual that the receive-in signal has a substantially zero level to make the loudspeaker 16 produce no audible sound. The local digital signal therefore comprises the lower acoustic signal component as a digital signal. When the lower send-in signal component does not comprise a lower acoustic signal component but does comprise a lower reverberation signal component, the local digital signal is rendered substantially quiescent. The local digital signal is supplied to a digital-to-analog converter 36 at a predetermined sampling period and results in a lower local signal component.

A voice switch 37 is responsive to the higher send-in and receive-in signal components for producing a higher local signal component. In general the voice switch compares the inputs thereto to suppress the reverberation echo. If the receive-in high frequency component is large and the send-out high frequency component is small, the latter will be suppressed on the assumption that the latter is due to echo. The voice switch 37 may alternatively suppress the higher send-in signal component when the higher receive-in signal component has an appreciably high level. In any event, a combining circuit 39 is for combining the lower and the higher local signal components into the send-out signal.

Inasmuch as the lower frequency band has an upper frequency edge at 2 kHz at the highest, the predetermined sampling period may be 250 microseconds or less. It is readily possible to implement the echo canceller 35 by a logic circuit which carries out logic operation a necessary number of times in each sampling period. It may be mentioned here that a long-distance conference communication system may have a frequency band which is 10 kHz wide or more. Even in this event, it is feasible to implement a self-adaptive echo canceller operable as above.

The conventional echo cancelling circuit is, however, of analog circuitry except for the echo canceller 35. The echo cancelling circuit therefore becomes bulky. Moreover, the circuit characteristics are subject to thermal variation and aging. The echo suppressor 37 comprises circuitry for detecting presence and absence of the acoustic signal in the send-in signal and circuitry for providing adjustable attenuation to the send-in signal in the absence of the acoustic signal. The echo suppressor 37, even if implemented by a center clipper, is hardly rendered compact. In the conventional echo cancelling circuit, such an echo suppressor 37 is put into operation by the higher receive-in and send-in signal components which have less concentrated power spectrum than the lower receive-in and send-in signal components. The echo supressor 37 is liable to misoperation.

Figure 2:
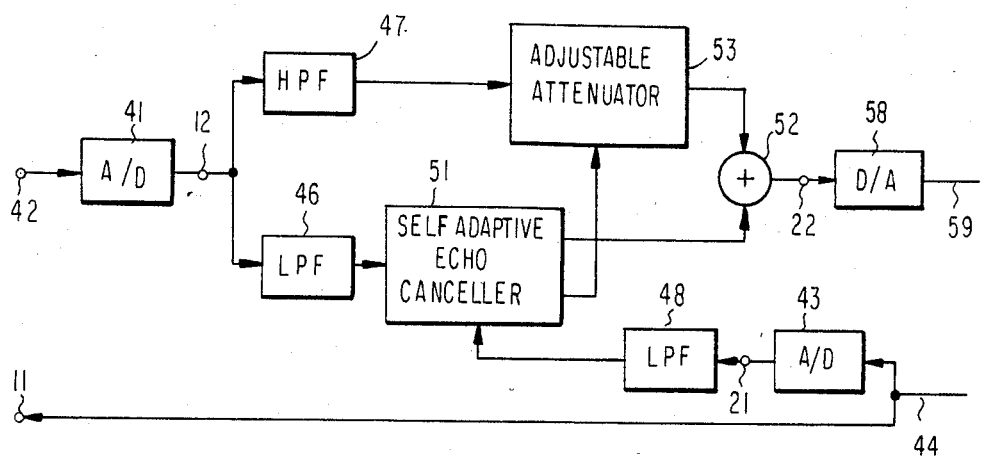
FIG. 2 is a block diagram of an echo cancelling circuit according to an embodiment of the instant invention.

Referring now to FIG. 2, an echo cancelling circuit according to an embodiment of this invention has receive-out, send-in, receive-in, and send-out terminals 11, 12, 21, and 22 as described in conjunction with FIG. 1. As will be described in the following, the circuit elements are digital circuits except that the receive-out terminal 11 feeds an analog receive-out signal towards the loudspeaker 16 (FIG. 1) in the illustrated example.

In FIG. 2, the echo cancelling circuit comprises a send-in analog-to-digital converter 41 for converting an analog send-in signal received from the microphone 18 (FIG. 1) through a circuit input terminal 42 to a send-in digital signal. A receive-in analog-to-digital converter 43 is for converting an analog receive-in signal supplied from a remote party (not shown) through a receiving path 44 to a receive-in digital signal. The send-in and the receive-in analog-to-digital converters 41 and 43 correspond to the analog-to-digital converters 34 and 33 described in connection with FIG. 1, respectively.

A first send-in digital filter 46 is a digital low-pass filter. The first send-in digital filter 46 is responsive to the send-in digital signal for producing a lower send-in signal component of the lower frequency band described above. When the microphone 18 is spoken into, the send-in digital signal comprises an acoustic signal. In this event, the lower send-in signal component comprises a lower acoustic signal component of the lower frequency band as a digital signal. When the receive-in digital signal carries a voice signal sent from the remote party to make the loudspeaker 16 reproduce audible sound, the send-in digital signal comprises a reverberation signal. Under these circumstances, the lower send-in signal component comprises a lower reverberation signal component again as a digital signal.

A second send-in digital filter 47 is a digital high-pass filter responsive to the send-in digital signal for producing a higher send-in signal component of the above-mentioned higher frequency band. Like the lower send-in signal component, the higher send-in signal component comprises a higher acoustic signal component and a higher reverberation signal component depending on the circumstances.

A receive-in digital filter 48 is another digital low-pass filter. The receive-in digital filter 48 responds to the receive-in digital signal to produce a lower receive-in signal component of the lower frequency band. In the presence of the voice signal, the lower receive-in signal component comprises a lower voice signal component of the lower frequency band.

A self-adaptive echo canceller 51 is supplied directly with the lower send-in and receive-in signal components. Like the self-adaptive echo canceller 35 (FIG. 1), the echo canceller 51 is a digital circuit. It is preferred that the echo canceller be of the type disclosed in U.S. Pat. No. 3,660,619 issued to Seibi Chiba et al and assigned to the instant assignee.

As will later be described in detail, the echo canceller 51 responds to the lower send-in and receive-in signal components to produce at first a simulation signal which substantially simulates the echo signal comprising the reverberation signal. Subtracting the simulation signal from the lower send-in signal component, the echo canceller 51 supplies a combining circuit 52 with a lower local digital signal component which is of the lower frequency band and is exempted substantially from the echo signal which may comprise the reverberation signal. More specifically, the lower local digital signal component is free from a lower echo signal component of the lower frequency band.

In addition, the echo canceller 51 responds to at least one of the lower send-in and receive-in signal components to produce a control signal indicative of presence and absence of the lower acoustic signal component in the lower send-in signal component and consequently presence and absence of the acoustic signal in the send-in digital signal. The echo canceller 51 may therefore comprise a double-talk detector as will become clear as the description proceeds.

On the one hand, the control signal is delivered to an adjustable attenuator 53 for the purpose which will presently be described. Let it be mentioned here that the adjustable attenuator 53 is for suppling the combining circuit 52 with a higher local digital signal component which is of the higher frequency band and is free from a higher echo signal component of the higher frequency band. On the other hand, the control signal may be used in the echo canceller 51 in controlling the self-adaptive operation.

Figure 3:
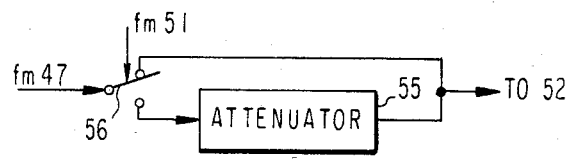
FIG. 3 is a block diagram of an adjustable attenuator for use in the echo cancelling circuit shown in FIG. 2.

Turning to FIG. 3, the adjustable attenuator 53 may comprise a digital attenuator 55 for providing a predetermined positive attenuation to a local input signal supplied thereto. The digital attenuator 55 may be adjustable. A switch 56 depicted as a mechanically operable switch merely for convenience of illustration, is supplied with the higher send-in signal component from the second send-in digital filter 47 and is controlled by the control signal derived from the self-adaptive echo canceller 51.

When the lower acoustic signal component is absent, the switch 56 feeds the higher send-in signal component to the digital attenuator 55 as the switch output signal. The higher send-in signal component is given the predetermined positive attenuation to be sent to the combining circuit 52 as the higher local digital signal component. When the lower acoustic signal component is present, the switch 56 transmits the higher send-in signal component directly to the combining circuit 52 as the higher local digital signal component with a zero attenuation given to the higher send-in signal component. It is now understood that the predetermined positive attenuation should be such as to give an approximately zero digital level to the higher send-in signal component, which is the higher echo signal component in the absence of the lower acoustic signal component.

Turning back to FiG. 2, the lower and the higher local digital signal components are combined by the combining circuit 52 into a digital send-out signal and then delivered to the send-out terminal 22. The send-out digital signal is exempted from the lower and the higher echo signal components, namely, the echo signal which may comprise the reverberation signal. The digital send-out signal is converted to an analog send-out signal by a digital-to-analog converter 58, which is a counterpart of the digital-to-analog converter 36 described in conjunction with FIG. 1. The analog send-out signal is sent to the remote party through a sending path 59.

Figure 4:
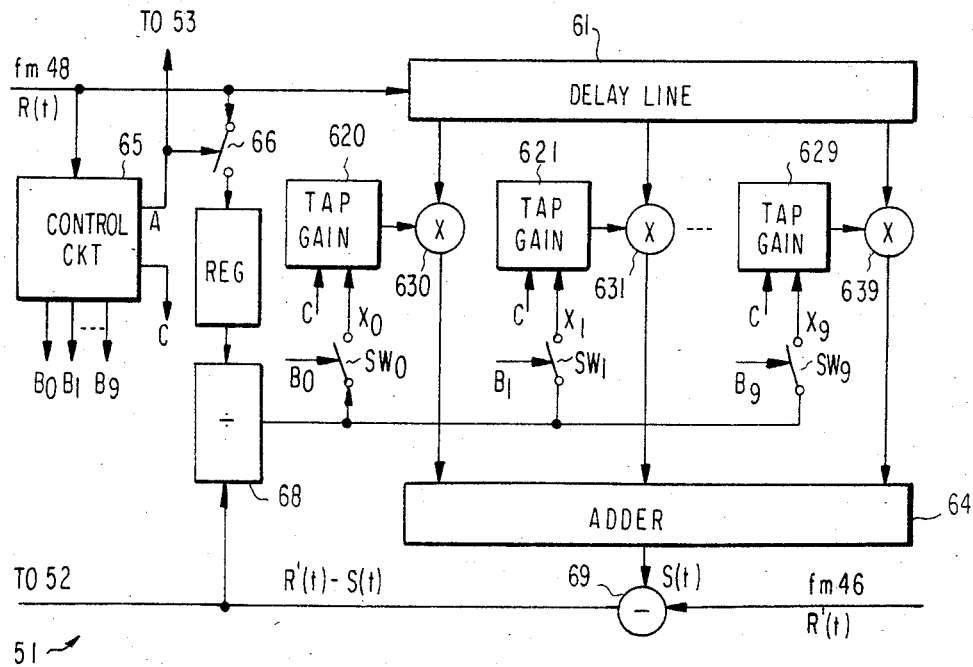
FIG. 4 is a block diagram of a self-adaptive echo canceller for use in the echo cancelling circuit depicted in FIG. 2.

Finally referring to FIG. 4, an example of the echo canceller revealed in the above-referenced Chiba et al patent will briefly be described for completeness of disclosure. When used as the self-adaptive echo canceller 51, the echo canceller of the Chiba et al patent should be a digital circuit supplied with the lower receive-in and send-in signal components as first and second input signal which take digital levels $R(t)$ and $R'(t)$, respectively, where t represents sampling instants of the predetermined sampling period described in connection with the converters 33, 34, and 36 (FIG. 1).

The echo canceller 51 comprises a tapped delay line 61 supplied with the first input signal which will be denoted by $R(t)$ for simplicity of denotation. The delay line 61 has a plurality of taps, I in number. The taps may be zeroth through ninth or $(I-1)$-th taps for producing successively delayed signals of digital levels $R(t_0)$, $R(t_{-1})$, . . . , and $R(t_{-9})$, respectively, where $t_0$ represents a current sampling instant at which the input signal $R(t)$ reaches the delay line 61 and where $t_{31}$ 1 through $t_{-9}$ represent successively previous sampling instants. It is to be noted here that the signal $R(t_0)$ is not a really "delayed" signal but is so named merely for convenience of description. The lower voice signal component will be referred to merely as a voice component.

Zeroth through ninth tap gain registers 620, 621, . . . , and 629 are for holding zeroth through ninth digital tap gains $X_0$, $X_1$, . . . , and $X_9$, respectively, as will shortly be described. Zeroth through ninth digital multipliers 630, 631, . . . , and 639 are for multiplying the delayed signals $R(t_0)$ through $R(t_{-9})$ by the correspondingly numbered digital tap gains $X_0$ through $X_9$, respectively. The zeroth through the ninth digital multipliers 630 to 639 supply a digital adder 64 with zeroth through ninth product signals which take zeroth through ninth digital product levels $X_0R(t_0)$, $X_1R(t_{-1})$, . . . , and $X_9R(t_{-9})$, respectively. Summing up the product signals, the adder 64 produces a sum signal which has a digital sum level $S(t)$ and serves as the above-described simulation signal as will become clear from the following.

A digital control circuit 65 is responsive to the first input signal $R(t)$ for primarily producing a control signal A by detecting presence and absence of the voice component in the first input signal $R(t)$. More particularly, let it be assumed that absence of the voice component is detected at the current sampling instant $t_0$ after detection of the absence during a simulation period which is equal to the predetermined sampling period multiplied by the number I of taps of the delay line 61. In this event, the control circuit 65 makes a control pulse appear in the control signal A. Otherwise, the control signal A is given no control pulse. The control signal A is delivered to the adjustable attenuator 53 (FIG. 2). The control pulse makes the switch 56 (FIG. 3) supply the higher send-in signal component to the combining circuit 52 (FIG. 2) as the higher local digital signal component during the simulation period. The control signal A is moreover supplied to a circuit switch 66, which is drawn as an on-off switch and is closed by each control pulse.

Whenever the circuit switch 66 is closed, the first input signal $R(t)$ is fed to a circuit register 67 and is stored therein as a digital content. It will be understood that the circuit register 67 is renewed at the simulation period. The digital content is, however, not materially rewritten by the renewal because the input signal $R(t)$ has a substantially constant digital level under the circumstances. The digital content of the circuit register 67 is delivered to a divisor input terminal of a digital divider 68.

A digital subtractor 69 is for subtracting the sum signal $S(t)$ from the second input signal $R'(t)$ to produce a difference signal of a digital difference level which is equal to $[R'(t)-S(t)]$. The difference signal is supplied to a dividend input terminal of the digital divider 68. As will be understood from the following, the difference signal is exempted from the lower echo signal component which may comprise the lower reverberation signal component. The difference signal is supplied to the combining circuit 52.

The digital divider 68 produces a quotient signal representative of a digital quotient $[(R'(t)-S(t))/R(t_0)]$ given by the digital difference level $[R(t)-S(t)]$ divided by the digital content $R(t_0)$ of the circuit register 67. The control circuit 65 furthermore produces zeroth through ninth switching pulses $B_0$, $B_1$ . . . , and $B_9$ at the current sampling instant $t_0$ and successively following sampling instants $t_1$ through $t_9$, respectively, in each simulation period as will soon be described. Before start of operation of the echo canceller 51, the control circuit 65 produces a reset or clear pulse C to simultaneously clear the tap gain registers 630 through 629 all into a cleared state. The current and the successively following sampling instants $t_0$ through $t_9$ or $t_{I-1}$ will be called zeroth through ninth or $(I-1)$-th sampling instants.

At the zeroth sampling instant $t_0$, let it be presumed for brevity of description that the first input signal $R(t)$ carries no voice component and that all tap gain registers 620 through 629 remain in the cleared state. The first input signal $R(t)$ takes a zeroth digital level $R(t_0)$. Inasmuch as all tap gains are nevertheless equal to zero, all digital product levels are equal to zero. The sum signal $S(t)$ has a zero digital level. The second input signal $R'(t)$ takes a digital level $R'(t_0)$. The quotient signal represents a zeroth digital quotient [R'(t$_0$)/R(t$_0$)]. The zeroth switching pulse B$_0$ is produced at this instant to close a zeroth switch SW$_0$ for an interval of time which is necessary and sufficient to store the zeroth digital quotient in the zeroth tap gain register 620 as the zeroth digital tap gain X$_0$.

At the first sampling instant t$_1$, the first and the second input signals R(t) and R'(t) have digital levels R(t$_1$) and R'(t$_1$). The "delayed" signal of the zeroth tap has a level R(t$_1$). The zeroth digital product level becomes equal to X$_0$R(t$_1$). Other digital product levels are equal to zero. The digital sum level S(t) becomes equal to X$_0$R(t$_1$). Inasmuch as the zeroth digital level R(t$_0$) is retained in the circuit register 67, the quotient signal represents a first digital quotient [(R'(t$_1$)−X$_0$R(t$_1$))/R(t$_0$)]. The first switching pulse B$_1$ closes a first switch SW$_1$ to load the first tap gain register 621 with the first digital quotient as the first digital tap gain X$_1$.

At an i-th sampling instant t$_i$ where i represents a natural number which is less than the number I of taps less one, the first and the second input signals R(t) and R'(t) take digital levels R(t$_1$) and R'(t$_i$). The delayed signals produced at the zeroth through the (i−1)-th taps, have digital levels R(t$_i$), R(t$_{i-1}$), ..., and R(t$_1$). The zeroth through the (i−1)-th digital product levels are equal to X$_0$R(t$_i$), X$_1$R(t$_{i-1}$), ..., and X$_{i-1}$R(t$_1$). Other products, if any, have a zero digital level. The digital sum level S(t) becomes equal to:

$$S(t) = \sum_{k=0}^{i-1} X_k R(t_{i-k}),$$

which will be denoted by Σ(i−1). The quotient signal represents an i-th digital quotient [(R'(t$_i$)−Σ(i−1)/R(t$_0$)]. The i-th switching pulse B$_i$ closes an i-th switch SW$_i$ to load the i-th tap gain register 621 with the i-th digital quotient as the i-th digital tip gain X$_i$.

It is now understood that a combination of the tapped delay line 61, the tap gain registers 620 through 629, and the digital adder 64 serves as a digital transversal filter of a tenth or I-th order. The control signal A is used in controlling the circuit switch 66 to make a combination of the circuit register 67 and the digital divider 68 serve as a tap gain adjusting circuit which is responsive to the lower send-in and receive-in signal components to self-adaptively control the digital tap gains.

As will be understood from the above and from the Chiba et al patent, it is possible to supply the control circuit 65 with the lower send-in signal component rather than with the lower receive-in signal component. In this event, the control circuit 65 makes the control pulse appear in the control signal A when the lower acoustic signal component is present in the lower send-in signal component.

Alternatively, the control circuit 65 may be supplied with both the lower send-in and receive-in signal components. The control circuit 64 compares the digital levels of the both with each other to produce the control pulse each time when the lower send-in signal component has a significantly higher digital level than the lower receive-in signal component to indicate presence of the lower acoustic signal component in the lower send-in signal component. The control circuit 65 does not produce the control pulse each time when the lower receive-in signal component has an appreciably higher digital level than the lower send-in signal component to indicate presence of the lower voice signal component in the lower receive-in signal component and thereby to indicate absence of the lower acoustic signal component.

In either event, the lower receive-in signal component should be fed to the delay line 61 directly and to the circuit register 67 through the circuit switch 66. Moreover, the digital subtractor 69 should subtract the sum signal S(t) from the lower send-in signal component R'(t). Incidentally, absence and presence of the lower voice signal component in the lower receive-in signal component, are equivalent to presence and absence of the lower acoustic signal component in the lower send-in signal component, respectively. The simulation period may be different from that defined above.

In another example of the echo canceller revealed in the Chiba et al patent, a first magnetic drum is used as the tapped delay line 61. One substantially complete revolution of the drum provides the zeroth through the (I−1)-th delayed digital signals. A second magnetic drum is used as the zeroth through the (I−1)-th tap gain registers, such as 620 to 629, to provide the zeroth through the (I−1)-th digital tap gains during one substantially complete revolution. Binary bits of each digital tap gain are stored on a plurality of tracks on the second magnetic drum, respectively. The digital tap gains are therefrom read from the second magnetic drum by a plurality of reading heads and self-adaptively renewed by a plurality of writing heads. Instead of the switching pulses for the zeroth through the (I−1)-th switches, such as SW$_0$ to SW$_9$, the control circuit 65 supplies each writing head with a sequence of head activating pulses for the respective sampling instants either in the presence of the lower acoustic signal component in the lower send-in signal component or in the absence of the lower voice signal component in the lower receive-in signal component. A single digital multiplier is time-divisionally used as the zeroth through the (I−1)-th digital multipliers, such as 630 to 639. The digital adder 64 is for accumulating the digital product signals during each simulation period. It is possible to use an electronic memory of a circulating memory type as each of the magnetic drums.

While this invention has thus far been described in conjunction with a preferred embodiment and several modifications thereof, it will now be understood that an echo cancelling circuit according to this invention is characterized over the prior-art echo cancelling circuit by the facts that the circuitry is of the digital type and readily compactly and reliably implemented by the integrated semiconductor circuit techniques and that the lower send-in and/or receive-in (digital) signal components are used to cancel not only the lower echo signal component but also the higher echo signal component to further raise the compactness and the reliability.

It will moreover be understood that this invention can be implemented in various other manners. For instance, the digital low-pass and high-pass filters 46 through 48 may be digital band-pass filters. The adjustable attenuator 53 may be a variable attenuator which gives a zero attenuation and a continuously or stepwise rising attenuation to the higher send-in (digital) signal component when the lower acoustic signal component is present and when the level of the voice signal grows higher in the receive-in (digital) signal, respectively. The receive-out and the send-in terminals 11 and 12 may not be coupled to the acoustic equipment 15 but either to an ordinary telephone handset or to a telephone subscriber's substation comprising a loudspeaker and a microphone. A frequency shift circuit may be added to reduce the sampling frequency for the self-adaptive echo canceller 51. This is effective in rendering the echo cancelling circuit more compact. It is possible to understand in this event that each of the lower send-in and receive-in signal components has the shifted frequency. Incidentally, FIG. 2 shows a circuit in which the receive-in (digital) signal arriving at the receive-in terminal 21 is not directly supplied to the receive-out terminal 11. It will readily be appreciated that this circuitry is equivalent to a circuit in which the receive-out signal is derived from the receive-in signal.

I claim:

1. An echo cancelling circuit responsive to a receive-in digital signal for feeding a receive-out signal to a receiver and responsive to a send-in digital signal delivered from a transmitter for producing a send-out signal, said echo cancelling circuit being furthermore for exempting said send-out signal from an echo signal which results from said receive-in digital signal, said receive-in digital signal comprising voice information which makes said receiver reproduce audible sound, said send-in digital signal comprising an acoustic signal when said transmitter is spoken to, said echo cancelling circuit comprising:

a first send-in digital filter responsive to said send-in digital signal for producing a first send-in component, said first send-in component comprising an acoustic signal component when said send-in digital signal comprises said acoustic signal;

a second send-in digital filter responsive to said send-in digital signal for producing a second send-in component;

a receive-in digital filter responsive to said receive-in digital signal for producing a first receive-in component, said first receive-in component comprising a voice information component when said receive-in digital signal comprises said voice information;

echo cancelling means responsive to said first send-in component and said first receive-in component for self-adaptively cancelling said echo signal to produce a first local digital signal component which is exempted substantially from said echo signal, said echo cancelling means being furthermore responsive to at least one of said first send-in component and said first receive-in component for producing a control signal indicative of presence and absence of said acoustic signal component;

adjustable attenuating means responsive to said control signal for producing a second local digital signal component by attenuating said second send-in component; and combining means for combining said first and said second local digital signal components into said send-out signal.

2. An echo cancelling circuit as claimed in claim 1, wherein said adjustable attenuating mens is controlled by said control signal to give a zero attenuation or a finit attenuation to said second send-in component to produce said second local digital signal component when said control signal indicates presence or absence of said acoustic signal component, respectively.

3. An echo cancelling circuit as claimed in claim 2, wherein said adjustable attenuating means comprises:

a switch responsive to said control signal for suppling the output of said adjustable attenuating means with said second send-in component as said second local digital signal when said control signal indicates the presence of said acoustic signal component and for supplying said second send-in component to a digital attenuator when said control signal indicates the absence of said acoustic signal component; and a digital attenuator receiving said second send-in component and for giving said finite attenuation to said second send-in component to produce said second local digital signal component when said control signal indicates the absence of said acoustic signal component.

4. An echo cancelling circuit as claimed in claim 2, wherein said finite attenuation is adjustable.

5. An echo cancelling circuit as claimed in claim 1, wherein said echo cancelling means comprises:

control means responsive to at least one of said first send-in component and said first receive-in component for producing said control signal; and an echo canceller responsive to said first send-in component, said first receive-in component, and said control signal for self-adaptively cancelling said echo signal to produce said first digital signal component.

6. An echo cancelling circuit as claimed in claim 5, each of said first send-in component and said first receive-in component being sampled with a predetermined sampling period, wherein said echo canceller comprises:

a transversal filter for processing said first receive-in component by digital tap gains to produce a digital simulation signal which substantially simulates said echo signal;

a digital subtractor for substracting said simulation signal from said first send-in component to produce a digital difference signal; and tap gain adjusting means responsive to said first receive-in component, said difference signal, and said control signal for self-adaptively adjusting said digital tap gains so that said difference signal becomes said first local digital signal component.

* * * * *

UNITED STATES PATENT AND TRADEMARK OFFICE
CERTIFICATE OF CORRECTION

PATENT NO. : 4,591,670

DATED : May 27, 1986

INVENTOR(S) : Yasuo ITOH

It is certified that error appears in the above-identified patent and that said Letters Patent is hereby corrected as shown below:

Column 3, Line 54     "As microphone 18"

should read     --A microphone 18--

Column 7, Line 50     "where $t_{31\ 1}$"

should read     --where $t_{-1}$--

Column 8, Line 56     "registers 630 through 629"

should read     --registers 620 through 629--

Column 9, Line 38     "digital tip gain"

should read     --digital tap gain--

Column 10, Line 27     "are therefrom read"

should read     --are therefore read--

UNITED STATES PATENT AND TRADEMARK OFFICE
CERTIFICATE OF CORRECTION

PATENT NO.    : 4,591,670
DATED         : May 27, 1986
INVENTOR(S)   : Yasuo ITOH It is certified that error appears in the above-identified patent and that said Letters Patent is hereby corrected as shown below:

Column 12, Line 5     "attenuating mens is"

should read    --attenuating means is--

Column 12, Line 6     "or a finit"

should read    --or a finite--

Column 12, Line 23    "and for giving"

should read    --and giving--

Signed and Sealed this

Fifteenth Day of September, 1987

Attest:

DONALD J. QUIGG

*Attesting Officer*    *Commissioner of Patents and Trademarks*